(12) United States Patent
Wallenberger

(10) Patent No.: US 6,686,304 B1
(45) Date of Patent: Feb. 3, 2004

(54) GLASS FIBER COMPOSITION

(75) Inventor: Frederick T. Wallenberger, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/980,248

(22) PCT Filed: May 23, 2000

(86) PCT No.: PCT/US00/14155

§ 371 (c)(1),
(2), (4) Date: Nov. 28, 2001

(87) PCT Pub. No.: WO00/73231

PCT Pub. Date: Dec. 7, 2000

Related U.S. Application Data (60) Provisional application No. 60/136,538, filed on May 28, 1999.

(51) Int. Cl.[7] .......................... C03C 13/06; C03C 3/087
(52) U.S. Cl. ............................. 501/35; 501/36; 501/70
(58) Field of Search ................. 501/35, 36, 70

(56) References Cited

U.S. PATENT DOCUMENTS

| | | | |
|---|---|---|---|
| 3,600,205 A | 8/1971 | Breton | 106/50 |
| 3,847,626 A | 11/1974 | Erickson et al. | 106/50 |
| 3,929,497 A | 12/1975 | Clark-Monks | 106/50 |
| 4,066,466 A | 1/1978 | Neeley | 106/50 |
| 4,199,364 A | 4/1980 | Neeley | 106/50 |
| 4,542,106 A | 9/1985 | Sproull | 501/38 |
| 4,882,302 A | * 11/1989 | Horiuchi et al. | 501/27 |
| 5,789,329 A | 8/1998 | Eastes et al. | 501/36 |
| 5,843,854 A | * 12/1998 | Karppinen et al. | 501/36 |
| 6,136,735 A | * 10/2000 | Gallo et al. | 501/36 |

FOREIGN PATENT DOCUMENTS

| | | |
|---|---|---|
| FR | 2692248 | 6/1992 |
| FR | 2768144 | 9/1997 |
| GB | 520247 | 4/1940 |
| JP | 63225552 | 9/1988 |
| RU | 2027687 | 1/1995 |
| WO | 96/39362 | 12/1996 |
| WO | 99-12858 | * 3/1999 |

OTHER PUBLICATIONS

*The Manufacturing Technology of Continuous Glass Fibres*, by K. L. Loewenstein (3rd Ed 1993) pp. 30–44, 47–60, 85–107, 115–122, 126–135.
*Advanced Inorganic Fibers: Processes, Structures, Properties, Applications*, by Frederick T. Wallenberger(2000); pp. 81–102; 129–168.

* cited by examiner

*Primary Examiner*—Karl Group
(74) *Attorney, Agent, or Firm*—Dennis G. Millman; Andrew C. Siminerio (57) ABSTRACT

The present invention provides a glass fiber composition comprising: 52 to 62 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 1.7 to 2.6 percent by weight MgO, 0 to 10 percent by weight $B_2O_3$, 0 to 2 percent by weight $TiO_2$, 0 to 2 percent by weight BaO, 0 to 2 percent by weight $ZrO_2$, and 0 to 2 percent by weight SrO, and further including at least one material selected from the group consisting of: 0.05 to 1.5 percent by weight $Li_2O$, 0.05 to 1.5 percent by weight ZnO, 0.05 to 3 percent by weight MnO, and 0.05 to 3 percent by weight $MnO_2$, wherein the glass composition has a forming temperature of no greater than 2280° F. based on an NIST 714 reference standard and a liquidus temperature of no greater than 2155° F. In one nonlimiting embodiment of the invention, the $SiO_2$ content is 57 to 59 percent by weight, the $Na_2O$ content is up to 1 percent by weight, the CaO content is 22 to 24 percent by weight, the $Al_2O_3$ content is 12 to 14 percent by weight, the $Fe_2O_3$ content is up to 0.4 percent by weight, and the $K_2O$ content is up to 0.1 percent by weight, and the composition includes at least one material selected from the group consisting of: 0.2 to 1 percent by weight $Li_2O$, 0.2 to 1 percent by weight ZnO, up to 1 percent by weight MnO, and up to 1 percent by weight $MnO_2$.

22 Claims, 2 Drawing Sheets

GLASS FIBER COMPOSITION

CROSS REFERENCE TO RELATED PATENT APPLICATION

This application claims the benefit of U.S. Provisional Application No. 60/136,538, filed May 28, 1999.

BACKGROUND OF THE INVENTION

1. Field of the Invention

The present invention relates to glass compositions for making glass fibers, and more particularly to glass compositions having lowered liquidus and forming temperatures.

2. Technical Considerations

The most common glass composition for making continuous glass fiber strands for textiles and glass fiber reinforcements is "E" glass. The requirements as to what type of composition constitutes an E-glass composition are included in ASTM D578-98. An advantage of using E-glass is that its liquidus temperature is well below its forming temperature, i.e. typically greater than 100° F. (56° C.) and generally between 150° F. (83° C.) to 200° F. (111° C.). As used herein, the terms "forming temperature" and "$T_{FORM}$" mean the temperature of the glass at which the viscosity of the glass is log 3, or 1000 poise, and the terms "liquidus temperature" and "$T_{LIQ}$" mean the temperature at which solid phase (crystals) and liquid phase (melt) are in equilibrium. The difference between $T_{FORM}$ and $T_{LIQ}$, referred to herein as "delta T" or "$\Delta T$", is a common measure of the crystallization potential of a given melt composition. In the glass fiber forming industry, $\Delta T$ is typically maintained at a temperature of at least 90° F. (50° C.) in order to prevent devitrification of the molten glass in the bushing area of a glass fiber forming operation.

Boron and fluorine containing glass were developed to meet these operating conditions. More specifically, the boron and fluorine were included in the glass batch materials to act as fluxes during the glass melting operation. However, these materials are volatilized during melting and boron and fluorine emissions are released to the atmosphere. Since boron and fluorine are considered pollutants, these emissions are closely controlled by environmental regulations, which, in turn, requires careful control of the furnace operations and the use of expensive pollution control equipment. In response to this, low boron and/or low fluorine E-glasses were developed. As used herein, "low boron" means that the glass composition is no greater than 5 weight percent boron, and preferably boron-free and "low fluorine" means that the glass composition is no greater than 1 weight percent fluorine, and preferably is fluorine-free.

For example, U.S. Pat. No. 3,929,497 discloses a boron-free and fluorine-free glass composition containing titanium dioxide in the range of 0.5 to 5 percent by weight and $Fe_2O_3$ in the range of 5 to 15 percent by weight.

U.S. Pat. No. 4,199,364 discloses a boron-free and fluorine-free glass composition that contains $Li_2O$ in the range of 0.1 to 1.5 percent by weight and may also include barium oxide. The liquidus temperature of the compositions is over 2200° F.

U.S. Pat. No. 4,542,106 discloses a boron-free and fluorine-free glass composition that contains 1 to 5 percent by weight $TiO_2$. The fibers also have a seed count of 5 seeds or less per cubic centimeter of glass and an electrical leakage value of 2.8 nanoamperes or less.

U.S. Pat. No. 5,789,329 discloses a boron-free and fluorine-free glass composition that contains up to 0.9 percent by weight $TiO_2$ and has a $\Delta T$ of at least 100° F. (56° C.).

For additional information concerning glass compositions and methods for fiberizing the glass composition, see K. Loewenstein, *The Manufacturing Technology of Continuous Glass Fibres*, (3d Ed. 1993) at pages 30–44, 47–60, 115–122 and 126–135, and F. T. Wallenberger (editor), *Advanced Inorganic Fibers: Processes, Structures, Properties, Applications*, (2000) at pages 81–102 and 129–168, which are hereby incorporated by reference.

Because the actual fiber forming operation is conducted at high temperatures, there are high energy costs associated with its production. In addition, the high temperatures accelerate the degradation of the refractory used in the glass melting furnace as well as the bushings used to form the fibers. The bushings include precious metals that cannot be recovered from the glass as the bushings corrode. It would be advantageous to produce the glass fibers at the lowest possible forming and liquidus temperatures so as to reduce the energy costs and thermal load on the furnace refractory and bushings, while at the same time provide the $\Delta T$ required to ensure an uninterrupted glass fiber forming operation. Reducing the forming and liquidus temperatures of the glass compositions can also result in environmental benefits, such as but not limited to, a reduction in the amount of fuel required to generate the energy necessary for the fiber forming operation, as well as a reduction in the flue gas temperature. In addition, it would be advantageous if the glass compositions are low fluoride and/or low boron compositions, and preferably are fluorine-free and/or boron-free, so as to reduce or eliminate the environmental pollutants associated with these materials.

SUMMARY OF THE INVENTION

The present innovation provides a glass fiber composition comprising: 52 to 62 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 1.7 to 2.9 percent by weight MgO, 0 to 10 percent by weight $B_2O_3$, 0 to 2 percent by weight $TiO_2$, 0 to 2 percent by weight BaO, 0 to 2 percent by weight $ZrO_2$, and 0 to 2 percent by weight SrO, wherein the glass composition has a forming temperature of no greater than 2280° F. based on an NIST 714 reference standard and a liquidus temperature of no greater than 2155° F. In one nonlimiting embodiment of the invention, the glass fiber composition further includes at least one material selected from the group consisting of: 0.05 to 1.5 percent by weight $Li_2O$, 0.05 to 1.5 percent by weight ZnO, 0.05 to 3 percent by weight MnO, and 0.05 to 3 percent by weight $MnO_2$.

The present invention also provides a glass fiber composition consisting essentially of: 52 to 62 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 2.2 to 2.9 percent by weight MgO, 0 to 10 percent by weight $B_2O_3$, 0 to 2 percent by weight $TiO_2$, 0 to 2 percent by weight BaO, 0 to 2 percent by weight $ZrO_2$, and 0 to 2 percent by weight SrO, wherein the glass composition has a forming temperature of no greater than 2280° F. based on an NIST 714 reference standard and a liquidus temperature of no greater than 2155° F.

The present innovation provides a glass fiber composition comprising: 52 to 62 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 1.7 to 2.6 percent by weight MgO, 0 to 10 percent by weight $B_2O_3$, 0 to 2 percent by weight $TiO_2$, 0 to 2 percent by weight BaO, 0 to 2 percent by weight $ZrO_2$, and 0 to 2 percent by weight SrO, and further including at least one material selected from the group consisting of: 0.05 to 1.5 percent by weight $Li_2O$, 0.05 to 1.5 percent by weight ZnO, 0.05 to 3 percent by weight MnO, and 0.05 to 3 percent by weight $MnO_2$, wherein the glass composition has a forming temperature of no greater than 2280° F. based on an NIST 714 reference standard and a liquidus temperature of no greater than 2155° F. In one nonlimiting embodiment of the invention, the $SiO_2$ content is 57 to 59 percent by weight, the $Na_2O$ content is up to 1 percent by weight, the CaO content is 22 to 24 percent by weight, the $Al_2O_3$ content is 12 to 14 percent by weight, the $Fe_2O_3$ content is up to 0.4 percent by weight, and the $K_2O$ content is up to 0.1 percent by weight, and the composition includes at least one material selected from the group consisting of: 0.2 to 1 percent by weight $Li_2O$, 0.2 to 1 percent by weight ZnO, up to 1 percent by weight MnO, and up to 1 percent by weight $MnO_2$.

DETAILED DESCRIPTION OF THE INVENTION

The base composition for the glass fibers of the present invention suitable for textiles and glass fiber reinforcements includes the following main constituents in weight percent (wt %) based on the total weight of the final glass composition.

|  | broad range | preferred range | most preferred range |
| --- | --- | --- | --- |
| $SiO_2$ (wt %) | 52 to 62 | 55 to 61 | 57 to 59 |
| $Na_2O$ (wt %) | 0 to 2 | up to 1.5 | up to 1 |
| CaO (wt %) | 16 to 25 | 20 to 25 | 22 to 24 |
| $Al_2O_3$ (wt %) | 8 to 16 | 11 to 14 | 12 to 14 |
| $Fe_2O_3$ (wt %) | 0.05 to 0.80 | up to 0.5 | up to 0.4 |
| $K_2O$ (wt %) | 0 to 2 | up to 1 | up to 0.1 |

It should be appreciated that numerical values discussed herein, such as but not limited to weight percent of materials, length of time or temperatures, are approximate and are subject to variations due to various factors well known to those skilled in the art such as, but not limited to, measurement standards, equipment and techniques. For example, where it states in the present application that the range for $SiO_2$ is 52 to 62 weight percent, this range is about 52 to about 62 weight percent, and where it states that the forming temperature of a glass composition should be no greater than 2280° F. (1249° C.), the temperature is about 2280° F.

MgO is also a main constituent of the glass compositions of the present invention. It has been found that the heating and melting profile of a glass fiber composition, and in particular the liquidus temperature, can be controlled and in particular optimized by controlling the amount of MgO, which an object of the present invention and will be discussed later in more detail.

Oftentimes additional materials are added to the glass composition to modify the melt properties of the glass. For example, and without limiting the present invention, $Li_2O$, $ZnO_2$, MnO and $MnO_2$ can be added to the glass fiber composition to reduce $T_{LIQ}$. In one nonlimiting embodiment of the glass fibers of the present invention, the glass composition can include one or more of these materials in the following amounts.

|  | broad range | preferred range |
| --- | --- | --- |
| $Li_2O$ (wt %) | 0.05 to 1.5 | 0.2 to 1 |
| ZnO (wt %) | 0.05 to 1.5 | 0.2 to 1 |
| MnO (wt %) | 0.05 to 3 | up to 1 |
| $MnO_2$ (wt %) | 0.05 to 3 | up to 1 |

It is believed that levels of these materials less than 0.05 wt % would be considered either tramp amounts or so low that they will not materially impact the glass melt properties.

Boron is another material that can be added to glass fiber compositions to reduce $T_{LIQ}$. However, as discussed earlier, the inclusion of boron results in the production of particulates that, depending on the particulate level, may have to be removed from a melting furnace exhaust stream before being released into the environment. Although the amount of $B_2O_3$ in a glass fiber composition can be as high as 10 wt %, one nonlimiting embodiment of a glass composition of the present invention includes no greater than 3 wt % $B_2O_3$, preferably no greater than 2 wt % $B_2O_3$, and more preferably no greater than 1 wt % $B_2O_3$. In another nonlimiting embodiment of the invention, the glass composition is essentially boron-free, i.e. it includes no more than a trace amount of $B_2O_3$, which is considered herein to be up to 0.05 wt % $B_2O_3$, and preferably does not include any $B_2O_3$.

It should be appreciated that glass fiber compositions can include other constituents and the present invention contemplates the inclusion of other materials in the glass fiber compositions, such as but not limited to, 0 to 2 wt % each of $TiO_2$, BaO, $ZrO_2$ and SrO.

In addition, because of the environmental concerns discussed earlier, although not limiting in the present invention, the glass compositions are preferably low fluorine compositions, i.e. no greater than 0.30 wt % fluorine, and more preferably are fluorine-free, i.e. it includes no more than a trace amount of fluorine, which is considered herein to be up to 0.05 wt % fluorine, and preferably does not include any fluorine.

It should be appreciated that the glass compositions disclosed herein can also include small amounts of other materials, for example melting and refining aids, tramp materials or impurities. For example and without limiting the present invention, melting and fining aids, such as $SO_3$, are useful during production of the glass, but their residual amounts in the glass can vary and have no material effect on the properties of the glass product. In addition, small amounts of the additives discussed above can enter the glass composition as tramp materials or impurities included in the raw materials of the main constituents.

Commercial glass fibers of the present invention can be prepared in the conventional manner well known in the art, by blending the raw materials used to supply the specific oxides that form the composition of the fibers. For example, typically sand is used for $SiO_2$, clay for $Al_2O_3$, lime or limestone for CaO, and dolomite for MgO and some of the CaO. As discussed earlier, the glass can include other additives that are added to modify the glass properties as well as small amounts of melting and refining aids, tramp materials or impurities.

After the ingredients are mixed in the proper proportions to provide the desired weight of each constituent for the desired glass, the batch is melted in a conventional glass fiber melting furnace and the resulting molten glass is passed along a conventional forehearth and into a glass fiber forming bushing located along the bottom of the forehearth, as is well known to those skilled in the art. During the glass melting phase, the glass is typically heated to a temperature of at least 2550° F. (1400° C.). The molten glass is then drawn or pulled through a plurality of holes in the bottom of the bushing. The streams of molten glass are attenuated to filaments by winding a strand of filaments on a forming tube mounted on a rotatable collet of a winding machine. Alternatively, the fiber forming apparatus can be, for example, a forming device for synthetic textile fibers or strands in which fibers are drawn from nozzles, such as but not limited to a spinneret, as is known to those skilled in the art. Typical forehearths and glass fiber forming arrangements are shown in K. Loewenstein, *The Manufacturing Technology of Continuous Glass Fibres*, (Third Edition 1993) at pages 85–107 and pages 115–135, which are hereby incorporated by reference.

Tables 1–7 show laboratory examples of glass fiber compositions that illustrate the effect of MgO on the liquidus temperature of the glass compositions. Boron and fluorine were not included in these compositions.

The glass fiber compositions shown in Tables 1–7 were prepared from reagent grade oxides (e.g., pure silica or calcia). The batch size for each example was 1000 grams. The individual batch ingredients were weighed out, combined and placed in a tightly sealed jar. The sealed jar was then placed in a paint shaker for 15 minutes to effectively mix the ingredients. A portion of the batch was then place into a platinum crucible, filling no more than ¾ of its volume. The crucible was then placed in a furnace and heated to 2600° F. (1425° C.) for 15 minutes. The remaining batch was then added to the hot crucible and heated to 2600° F. (1425° C.) for 15 to 30 minutes. The furnace temperature was then raised to 2700° F. (1482° C.) and held there for 4 hours. The molten glass was then fritted in water and dried. The forming temperature, i.e. the glass temperature at a viscosity of 1000 poise, was determined by ASTM method C965-81, and the liquidus temperature by ASTM method C829-81.

The weight percent of the constituents of the compositions shown in Tables 1–7 are based on the weight percent of each constituent in the batch. It is believed that the batch weight percent is generally about the same as the weight percent of the melted sample, except for glass batch materials that volatilize during melting, e.g. boron and fluorine. For boron, it is believed that the weight percent of $B_2O_3$ in a laboratory samples will be 5 to 10 percent less than the weight percent of $B_2O_3$ in the batch composition. For fluorine, it is believed that the weight percent of fluorine in a lab melt will be about 50 percent less than the weight percent of fluorine in the batch composition. It is further believed that glass fiber compositions made from commercial grade materials and melted under conventional operating conditions will have similar batch and melt weight percents as discussed above, except that the batch and melt weight percents for the volatile components of the composition will actually be closer to each other than the batch and melt wt % of the laboratory melts because in a conventional melting operation, the materials are exposed to the high melting temperatures for less time than the 4 hours of exposure for the laboratory melts.

Determination of the high temperature viscosity, $T_{FORM}$, was based on the glass samples being compared against physical standards supplied by the National Institute of Standards and Testing (NIST). In Tables 1–7, $T_{FORM}$ is reported based on comparison to either NIST 717A, which is a borosilicate glass standard, or NIST 714, which is a soda lime glass standard. Although either standard can be used, it is believed that the NIST 714 reference standard is more reliable because it has been observed that the NIST borosilicate standard 717A deteriorates at temperatures greater than 2150° F. (1177° C.). In comparing $T_{FORM}$ based on the two different standards, generally $T_{FORM}$ based on NIST 714 is 20° F. to 25° F. (11° C. to 16° C.) higher than $T_{FORM}$ based on NIST 717A. The $T_{LIQ}$ is unaffected by the NIST standard.

Examples 1–7 in Table 1 show the change in the liquidus temperature of a typical glass fiber forming composition that further includes 1 wt % $TiO_2$, as the amount of MgO is varied from 1.82 to 3 wt %. Examples 8–14 in Table 2 and Examples 15–30 in Table 3 show the change in the liquidus temperature of a typical glass fiber forming composition that further includes 1.5 or 1.1 wt % $TiO_2$, respectively, and 0.90 wt % $Li_2O$, as the amount of MgO is varied from 1.7 to 3.5 wt %. Examples 31–38 in Table 4 show the change in the liquidus temperature of a typical glass fiber forming composition that further includes 0.5 wt % $TiO_2$ and 0.90 wt % $Li_2O$, as the amount of MgO is varied from 1.7 to 3.12 wt %. Examples 39–49 in Table 5 show the change in the liquidus temperature of a typical glass fiber forming composition that further includes 1.1 wt % $TiO_2$, 0.45 wt % $Li_2O$ and 0.45 wt % ZnO, as the amount of MgO is varied from 1.7 to 3.1 wt %. Examples 47–54 in Table 6 show the change in the liquidus temperature of a typical glass fiber forming composition that further includes 1.1 wt % $TiO_2$ and 0.90 wt % ZnO, as the amount of MgO is varied from 1.7 to 3.1 wt %. Examples 59–66 in Table 7 show the change in the liquidus temperature of a typical glass fiber forming composition that further includes 1.1 wt % $TiO_2$, 0.30 wt % $Na_2O$, 0.60 wt % $Li_2O$ and 0.25 wt % $Fe_2O_3$ as the amount of MgO is varied from 1.7 to 3.1 wt %. In addition, the forming temperatures for selected glass compositions are also included in Tables 1–7.

Tables 1–7 also include the ratio $SiO_2/RO$, which is the ratio of the silica content of the batch, expressed as $SiO_2$, to the sum of the calcia and magnesia content, expressed as CaO and MgO, respectively.

TABLE 1

| | Ex. 1 | Ex. 2* | Ex. 3 | Ex. 4 | Ex. 5 | Ex. 6 | Ex. 7 |
|---|---|---|---|---|---|---|---|
| $SiO_2$ (wt %) | 59.83 | 59.61 | 60.13 | 60.43 | 60.43 | 59.61 | 59.61 |
| $Al_2O_3$ (wt %) | 12.21 | 12.16 | 12.27 | 12.39 | 12.33 | 12.16 | 12.16 |
| CaO (wt %) | 22.80 | 23.51 | 22.92 | 23.14 | 23.03 | 24.31 | 24.31 |
| MgO (wt %) | 3.00 | 2.62 | 2.50 | 2.00 | 2.00 | 1.82 | 1.82 |
| $TiO_2$ (wt %) | 1.00 | 1.00 | 1.00 | 1.00 | 1.00 | 1.00 | 1.00 |
| $Na_2O$ (wt %) | 0.96 | 0.90 | 0.98 | 1.01 | 1.01 | 0.90 | 0.90 |
| $Fe_2O_3$ (wt %) | 0.20 | 0.20 | 0.20 | 0.20 | 0.20 | 0.20 | 0.20 |

TABLE 1-continued

|  | Ex. 1 | Ex. 2* | Ex. 3 | Ex. 4 | Ex. 5 | Ex. 6 | Ex. 7 |
|---|---|---|---|---|---|---|---|
| $SiO_2/RO$ | 2.32 | 2.28 | 2.37 | 2.40 | 2.41 | 2.28 | 2.28 |
| $T_{FORM}$ (° F.) @ NIST 714 |  | 2265 | 2309 |  |  |  | 2278 |
| $T_{LIQ}$ (° F.) | 2160 | 2138 | 2127 | 2149 | 2154 | 2161 | 2182 |
| $\Delta T$ (° F.) |  | 127 | 182 |  |  |  | 94 |

*average of five samples

TABLE 2

|  | Ex. 8 | Ex. 9 | Ex. 10 | Ex. 11 | Ex. 12 | Ex. 13 | Ex. 14 |
|---|---|---|---|---|---|---|---|
| $SiO_2$ (wt %) | 59.62 | 59.30 | 59.97 | 60.09 | 60.21 | 60.33 | 60.75 |
| $Al_2O_3$ (wt %) | 12.12 | 12.10 | 12.19 | 12.22 | 12.24 | 12.24 | 12.35 |
| CaO (wt %) | 22.12 | 22.60 | 22.25 | 22.30 | 22.34 | 22.39 | 22.55 |
| MgO (wt %) | 3.50 | 3.40 | 2.90 | 2.70 | 2.50 | 2.30 | 1.70 |
| $TiO_2$ (wt %) | 1.50 | 1.50 | 1.50 | 1.50 | 1.50 | 1.50 | 1.50 |
| $Li_2O$ (wt %) | 0.90 | 0.90 | 0.90 | 0.90 | 0.90 | 0.90 | 0.90 |
| $Fe_2O_3$ (wt %) | 0.25 | 0.20 | 0.25 | 0.25 | 0.25 | 0.25 | 0.25 |
| $SiO_2/RO$ | 2.33 | 2.28 | 2.38 | 2.40 | 2.42 | 2.44 | 2.51 |
| NIST 717A |  |  |  |  |  |  |  |
| $T_{FORM}$ (° F.) | 2196 |  | 2197 | 2192 | 2196 | 2223 | 2239 |
| $T_{LIQ}$ (° F.) | 2158 | 2136 | 2122 | 2152 | 2124 | 2120 | 2131 |
| $\Delta T$ (° F.) | 38 |  | 75 | 40 | 72 | 103 | 108 |
| NIST 714 |  |  |  |  |  |  |  |
| $T_{FORM}$ (° F.) | 2219 |  | 2223 | 2215 | 2219 | 2248 | 2264 |
| $T_{LIQ}$ (° F.) | 2158 | 2136 | 2122 | 2152 | 2124 | 2120 | 2131 |
| $\Delta T$ (° F.) | 61 |  | 101 | 63 | 95 | 128 | 133 |

TABLE 3

|  | Ex. 15 | Ex. 16 | Ex. 17 | Ex. 18 | Ex. 19 | Ex. 20 | Ex. 21 | Ex. 23 |
|---|---|---|---|---|---|---|---|---|
| $SiO_2$ (wt %) | 59.61 | 59.61 | 59.73 | 59.85 | 59.97 | 60.09 | 60.10 | 60.10 |
| $Al_2O_3$ (wt %) | 12.92 | 12.92 | 12.92 | 12.95 | 12.97 | 13.00 | 13.00 | 13.00 |
| CaO (wt %) | 21.91 | 21.96 | 22.00 | 22.04 | 22.09 | 22.13 | 22.15 | 22.15 |
| MgO (wt %) | 3.50 | 3.30 | 3.10 | 2.90 | 2.70 | 2.50 | 2.50 | 2.50 |
| $TiO_2$ (wt %) | 1.10 | 1.10 | 1.10 | 1.10 | 1.10 | 1.10 | 1.10 | 1.10 |
| $Li_2O$ (wt %) | 0.90 | 0.90 | 0.90 | 0.90 | 0.90 | 0.90 | 0.9 | 0.9 |
| $Fe_2O_3$ (wt %) | 0.25 | 0.25 | 0.25 | 0.25 | 0.25 | 0.25 | 0.25 | 0.25 |
| $SiO_2/RO$ | 2.35 | 2.36 | 2.38 | 2.40 | 2.42 | 2.44 | 2.44 | 2.44 |
| NIST 717A |  |  |  |  |  |  |  |  |
| $T_{FORM}$ (° F.) |  |  |  |  |  |  |  |  |
| $T_{LIQ}$ (° F.) | 2154 | 2138 | 2127 | 2122 | 2120 | 2111 |  |  |
| $\Delta T$ (° F.) |  |  |  |  |  |  |  |  |
| NIST 714 |  |  |  |  |  |  |  |  |
| $T_{FORM}$ (° F.) | 2215 | 2215 | 2217 | 2217 | 2226 | 2233 | 2255 | 2259 |
| $T_{LIQ}$ (° F.) | 2154 | 2138 | 2127 | 2122 | 2120 | 2111 | 2070 | 2077 |
| $\Delta T$ (° F.) | 61 | 77 | 90 | 95 | 106 | 122 | 185 | 182 |

|  | Ex. 23 | Ex. 24 | Ex. 25 | Ex. 26 | Ex. 27 | Ex. 28 | Ex. 29 | Ex. 30 |
|---|---|---|---|---|---|---|---|---|
| $SiO_2$ (wt %) | 60.21 | 60.00 | 60.33 | 59.95 | 60.00 | 59.90 | 60.57 | 59.85 |
| $Al_2O_3$ (wt %) | 13.02 | 12.40 | 13.05 | 12.40 | 12.50 | 12.40 | 13.10 | 12.0 |
| CaO (wt %) | 22.18 | 22.05 | 22.22 | 23.30 | 23.70 | 23.55 | 22.31 | 23.80 |
| MgO (wt %) | 2.30 | 2.30 | 2.10 | 2.10 | 1.90 | 1.90 | 1.70 | 1.70 |
| $TiO_2$ (wt %) | 1.10 | 1.10 | 1.10 | 1.10 | 1.10 | 1.10 | 1.10 | 1.10 |
| $Li_2O$ (wt %) | 0.90 | 0.90 | 0.90 | 0.90 | 0.90 | 0.90 | 0.90 | 0.90 |
| $Fe_2O_3$ (wt %) | 0.25 | 0.25 | 0.25 | 0.25 | 0.25 | 0.25 | 0.26 | 0.25 |
| $SiO_2/RO$ | 2.46 | 2.46 | 2.48 | 2.36 | 2.34 | 2.35 | 2.52 | 2.35 |
| NIST 717A |  |  |  |  |  |  |  |  |
| $T_{FORM}$ (° F.) | 2226 | 2221 | 2273 | 2223 | 2237 |  | 2235 | 2210 |
| $T_{LIQ}$ (° F.) | 2088 | 2095 | 2077 | 2106 | 2082 | 2120 | 2086 | 2113 |
| $\Delta T$ (° F.) | 138 | 126 | 196 | 117 | 155 |  | 149 | 97 |

TABLE 3-continued

NIST 714

| | | | | | | | | |
|---|---|---|---|---|---|---|---|---|
| $T_{FORM}$ (° F.) | 2251 | 2246 | 2296 | 2248 | 2262 | 2235 | 2262 | 2235 |
| $T_{LIQ}$ (° F.) | 2088 | 2095 | 2077 | 2106 | 2082 | 2113 | 2086 | 2113 |
| $\Delta T$ (° F.) | 163 | 151 | 219 | 142 | 180 | 122 | 176 | 122 |

TABLE 4

| | Ex. 31 | Ex. 32 | Ex. 33 | Ex. 34 | Ex. 35 | Ex. 36 | Ex. 37 | Ex. 38 |
|---|---|---|---|---|---|---|---|---|
| $SiO_2$ (wt %) | 60.05 | 59.97 | 60.09 | 60.21 | 60.23 | 60.23 | 60.33 | 60.76 |
| $Al_2O_3$ (wt %) | 12.98 | 12.19 | 12.22 | 12.24 | 12.25 | 12.25 | 12.27 | 12.35 |
| CaO (wt %) | 22.14 | 23.56 | 23.31 | 23.35 | 23.36 | 23.36 | 23.40 | 23.56 |
| MgO (wt %) | 3.12 | 2.90 | 2.70 | 2.50 | 2.50 | 2.50 | 2.30 | 1.70 |
| $TiO_2$ (wt %) | 0.55 | 0.50 | 0.50 | 0.50 | 0.51 | 0.51 | 0.50 | 0.50 |
| $Li_2O$ (wt %) | 0.91 | 0.90 | 0.90 | 0.90 | 0.9 | 0.9 | 0.90 | 0.90 |
| $Fe_2O_3$ (wt %) | 0.25 | 0.25 | 0.25 | 0.25 | 0.25 | 0.25 | 0.25 | 0.25 |
| $SiO_2$/RO | 2.38 | 2.27 | 2.31 | 2.33 | 2.33 | 2.33 | 2.35 | 2.41 |
| NIST 717A | | | | | | | | |
| $T_{FORM}$ (° F.) | 2264 | 2181 | 2197 | 2192 | | | 2196 | 2201 |
| $T_{LIQ}$ (° F.) | 2136 | 2138 | 2125 | 2124 | 2120 | 2116 | 2131 | 2149 |
| $\Delta T$ (° F.) | 128 | 43 | 72 | 68 | | | 65 | 52 |
| NIST 714 | | | | | | | | |
| $T_{FORM}$ (° F.) | | 2205 | 2223 | 2215 | 2228 | 2235 | 2221 | 2226 |
| $T_{LIQ}$ (° F.) | 2136 | 2138 | 2125 | 2124 | 2120 | 2116 | 2131 | 2149 |
| $\Delta T$ (° F.) | | 68 | 98 | 91 | 108 | 119 | 90 | 77 |

TABLE 5

| | Ex. 39 | Ex. 40 | Ex. 41 | Ex. 42 | Ex. 43 | Ex. 44 | Ex. 45 | Ex. 46 | Ex. 47 | Ex. 48 | Ex. 49 |
|---|---|---|---|---|---|---|---|---|---|---|---|
| $SiO_2$ (wt %) | 59.73 | 59.85 | 59.97 | 60.09 | 60.21 | 60.33 | 59.54 | 60.45 | 59.47 | 60.57 | 59.40 |
| $Al_2O_3$ (wt %) | 12.92 | 12.95 | 12.97 | 13.00 | 13.02 | 13.05 | 12.16 | 13.08 | 12.16 | 13.10 | 12.16 |
| CaO (wt %) | 22.00 | 22.04 | 22.09 | 22.13 | 22.18 | 22.22 | 23.95 | 22.27 | 24.22 | 22.31 | 24.49 |
| MgO (wt %) | 3.10 | 2.90 | 2.70 | 2.50 | 2.30 | 2.10 | 2.10 | 1.90 | 1.90 | 1.70 | 1.70 |
| $TiO_2$ (wt %) | 1.10 | 1.10 | 1.10 | 1.10 | 1.10 | 1.10 | 1.10 | 1.10 | 1.10 | 1.10 | 1.10 |
| $Li_2O$ (wt %) | 0.45 | 0.45 | 0.45 | 0.45 | 0.45 | 0.45 | 0.45 | 0.45 | 0.45 | 0.45 | 0.45 |
| ZnO (wt %) | 0.45 | 0.45 | 0.45 | 0.45 | 0.45 | 0.45 | 0.45 | 0.45 | 0.45 | 0.45 | 0.45 |
| $Fe_2O_3$ (wt %) | 0.25 | 0.25 | 0.25 | 0.25 | 0.25 | 0.25 | 0.25 | 0.25 | 0.25 | 0.25 | 0.25 |
| $SiO_2$/RO | 2.38 | 2.40 | 2.42 | 2.44 | 2.46 | 2.48 | 2.29 | 2.50 | 2.28 | 2.52 | 2.27 |
| NIST 717A | | | | | | | | | | | |
| $T_{FORM}$ (° F.) | 2242 | 2248 | 2250 | 2259 | 2257 | 2273 | 2241 | 2273 | | 2278 | 2248 |
| $T_{LIQ}$ (° F.) | 2142 | 2134 | 2109 | 2097 | 2091 | 2084 | 2111 | 2082 | 2118 | 2075 | 2134 |
| $\Delta T$ (° F.) | 100 | 114 | 141 | 162 | 166 | 189 | 130 | 191 | | 203 | 114 |
| NIST 714 | | | | | | | | | | | |
| $T_{FORM}$ (° F.) | 2268 | 2275 | 2275 | 2284 | 2284 | 2300 | 2266 | 2300 | 2224 | 2305 | 2273 |
| $T_{LIQ}$ (° F.) | 2142 | 2134 | 2109 | 2097 | 2091 | 2084 | 2111 | 2082 | 2118 | 2075 | 2134 |
| $\Delta T$ (° F.) | 124 | 141 | 166 | 187 | 193 | 216 | 155 | 218 | 106 | 230 | 139 |

TABLE 6

| | Ex. 50 | Ex. 51 | Ex. 52 | Ex. 53 | Ex. 54 | Ex. 55 | Ex. 56 | Ex. 57 | Ex. 58 |
|---|---|---|---|---|---|---|---|---|---|
| $SiO_2$ (wt %) | 59.73 | 59.85 | 59.97 | 58.80 | 60.09 | 60.21 | 60.33 | 60.45 | 60.57 |
| $Al_2O_3$ (wt %) | 12.92 | 12.95 | 12.97 | 13.33 | 13.00 | 13.02 | 13.05 | 13.08 | 13.10 |
| CaO (wt %) | 22.00 | 22.04 | 22.09 | 23.45 | 22.13 | 22.18 | 22.22 | 22.27 | 22.31 |
| MgO (wt %) | 3.10 | 2.90 | 2.70 | 2.50 | 2.50 | 2.30 | 2.10 | 1.90 | 1.70 |
| $TiO_2$ (wt %) | 1.10 | 1.10 | 1.10 | 1.10 | 1.10 | 1.10 | 1.10 | 1.10 | 1.10 |
| ZnO (wt %) | 0.90 | 0.90 | 0.90 | 0.9 | 0.90 | 0.90 | 0.90 | 0.90 | 0.90 |
| $Fe_2O_3$ (wt %) | 0.25 | 0.25 | 0.25 | 0.25 | 0.25 | 0.25 | 0.25 | 0.25 | 0.25 |
| $SiO_2$/RO | 2.38 | 2.40 | 2.42 | 2.27 | 2.44 | 2.46 | 2.48 | 2.50 | 2.52 |
| NIST 717A | | | | | | | | | |
| $T_{FORM}$ (° F.) | 2282 | 2286 | 2296 | 2287 | 2304 | 2296 | 2307 | 2316 | 2298 |
| $T_{LIQ}$ (° F.) | 2138 | 2131 | 2118 | 2129 | 2115 | 2131 | 2136 | 2128 | 2140 |
| $\Delta T$ (° F.) | 144 | 155 | 178 | 158 | 189 | 165 | 171 | 178 | 158 |

TABLE 6-continued

|  | Ex. 50 | Ex. 51 | Ex. 52 | Ex. 53 | Ex. 54 | Ex. 55 | Ex. 56 | Ex. 57 | Ex. 58 |
|---|---|---|---|---|---|---|---|---|---|
| NIST 714 | | | | | | | | | |
| $T_{FORM}$ (° F.) | 2309 | 2313 | 2323 | 2314 | 2332 | 2323 | 2336 | 2345 | 2327 |
| $T_{LIQ}$ (° F.) | 2138 | 2131 | 2118 | 2129 | 2115 | 2131 | 2136 | 2138 | 2140 |
| $\Delta T$ (° F.) | 171 | 182 | 205 | 185 | 217 | 192 | 200 | 207 | 187 |

TABLE 7

|  | Ex. 59 | Ex. 60 | Ex. 61 | Ex. 62 | Ex. 63 | Ex. 64 | Ex. 65 | Ex. 66 |
|---|---|---|---|---|---|---|---|---|
| $SiO_2$ (wt %) | 59.80 | 59.75 | 59.70 | 59.65 | 59.60 | 59.55 | 59.50 | 59.45 |
| $Al_2O_3$ (wt %) | 12.25 | 12.25 | 12.25 | 12.25 | 12.25 | 12.25 | 12.25 | 12.25 |
| CaO (wt %) | 22.69 | 22.85 | 22.85 | 23.35 | 23.60 | 23.85 | 24.10 | 24.35 |
| MgO (wt %) | 3.10 | 2.90 | 2.70 | 2.50 | 2.30 | 2.10 | 1.90 | 1.70 |
| $TiO_2$ (wt %) | 1.10 | 1.10 | 1.10 | 1.10 | 1.10 | 1.10 | 1.10 | 1.10 |
| $Na_2O$ (wt %) | 0.30 | 0.30 | 0.30 | 0.30 | 0.30 | 0.30 | 0.30 | 0.30 |
| $Li_2O$ (wt %) | 0.60 | 0.60 | 0.60 | 0.60 | 0.60 | 0.60 | 0.60 | 0.60 |
| $Fe_2O_3$ (wt %) | 0.25 | 0.25 | 0.25 | 0.25 | 0.25 | 0.25 | 0.25 | 0.25 |
| $SiO_2/RO$ | 2.33 | 2.32 | 2.34 | 2.31 | 2.30 | 2.29 | 2.29 | 2.28 |
| NIST 717A | | | | | | | | |
| $T_{FORM}$ (° F.) | 2239 |  | 2242 | 2232 | 2235 | 2228 | 2228 | 2228 |
| $T_{LIQ}$ (° F.) | 2113 | 2113 | 2111 | 2118 | 2133 | 2143 | 2158 | 2178 |
| $\Delta T$ (° F.) | 126 |  | 131 | 113 | 103 | 85 | 70 | 50 |
| NIST 714 | | | | | | | | |
| $T_{FORM}$ (° F.) | 2264 | 2257 | 2268 | 2257 | 2260 | 2253 | 2253 | 2253 |
| $T_{LIQ}$ (° F.) | 2113 | 2113 | 2111 | 2118 | 2133 | 2143 | 2158 | 2178 |
| $\Delta T$ (° F.) | 151 | 144 | 157 | 139 | 127 | 110 | 95 | 75 |

Figure 1:
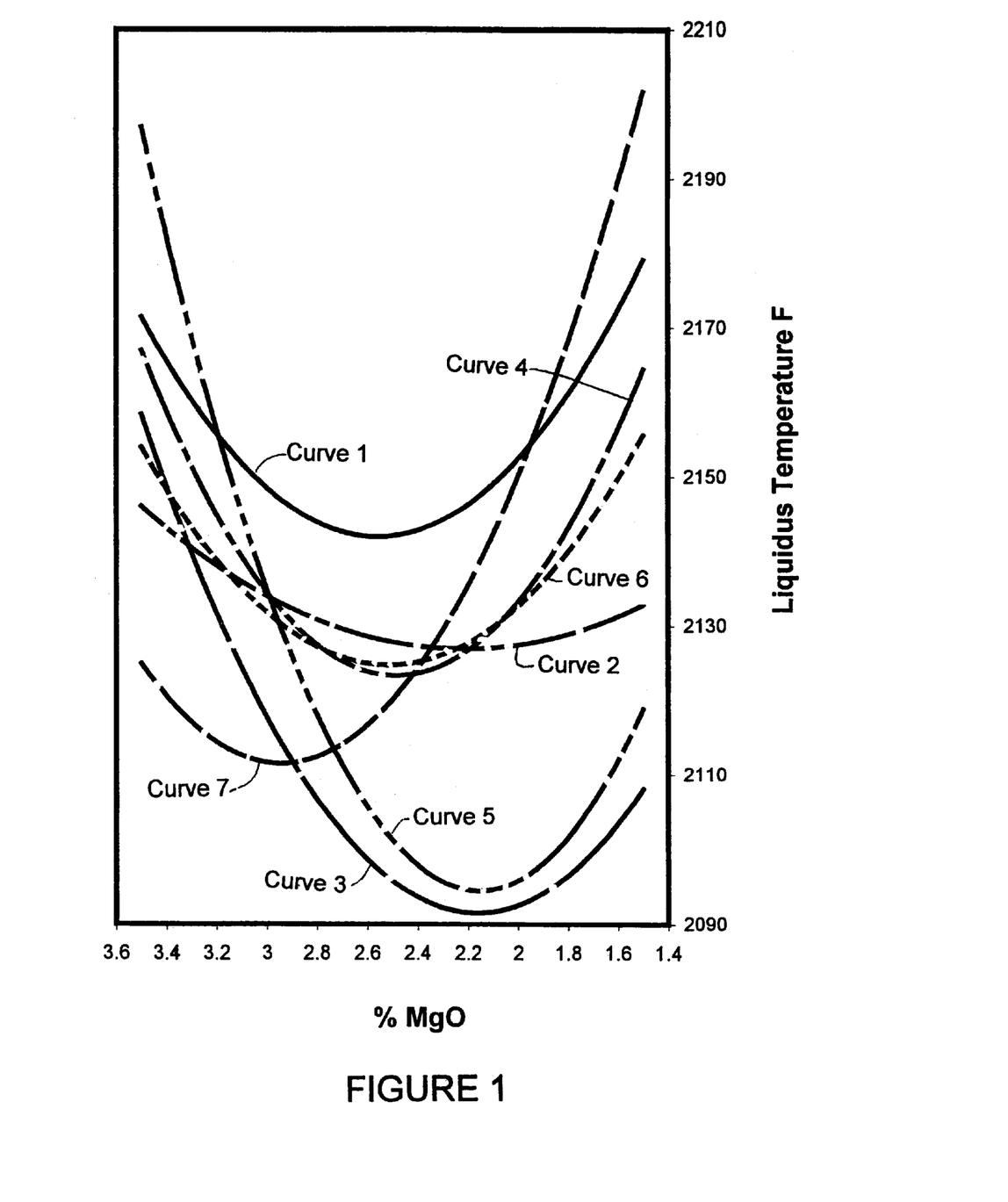
FIGS. 1 and 2 are graphs showing the relation between the amount of MgO and the liquidus temperature for glass fiber compositions of the present invention.
Figure 2:
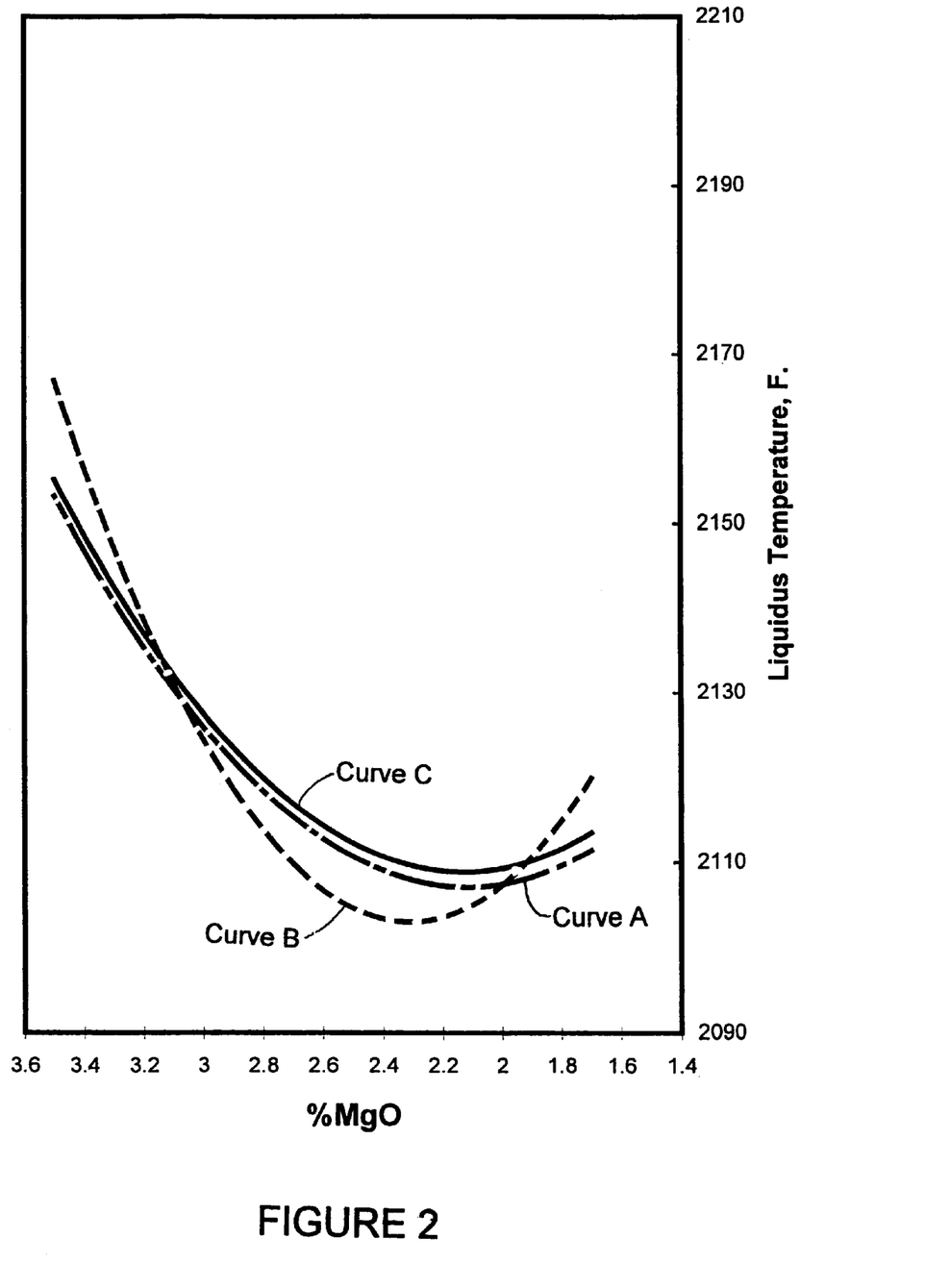

FIGS. 1 and 2 present curves illustrating the relationship between the forming temperature of the compositions shown in Tables 1–7 versus the amount of MgO, as discussed below in more detail. These curves are 2nd order polynomial curves generated using Microsoft® Excel 97 SR-2(f). Each of the curves shows that the amount of MgO impacts the liquidus temperature and in particular, there is a eutectic, i.e. minimum, in the liquidus temperature vs. the amount of MgO, indicating that the amount of MgO can be controlled to generate a minimum liquidus temperature for a glass fiber forming composition.

More specifically, Curve 1 in FIG. 1 illustrates the relationship between the liquidus temperature and the amount of MgO in the glass compositions shown in Examples 1–7 in Table 1. In order to expand the MgO range to 3.5 weight percent, a control composition was also included in the curve. The control composition included 59.37 wt % $SiO_2$, 12.94 wt % $Al_2O_3$, 21.00 wt % CaO, 3.5 wt % MgO, 1.42 wt % $TiO_2$, 1.01 wt % NaO and 0.22 wt % $Fe_2O_3$, and had a $T_{LiQ}$ of 2158° F. As can be seen, based on this curve, the liquidus temperature approaches a minimum in the range of 2.2 to 2.9 wt % MgO, and reaches a minimum temperature at 2.45 to 2.65 wt % MgO.

Curve 2 in FIG. 1 illustrates the relationship between the liquidus temperature and the amount of MgO in the glass compositions shown in Examples 8–14 in Table 2. As can be seen, based on this curve, the liquidus temperature approaches a minimum in the range of 1.85 to 2.6 wt % MgO, and reaches a minimum temperature at 2.0 to 2.45 wt % MgO.

Curve 3 in FIG. 1 illustrates the relationship between the liquidus temperature and the amount of MgO in the glass compositions shown in Examples 15–30 in Table 3. As can be seen, based on this curve, the liquidus temperature approaches a minimum in the range of 1.8 to 2.5 wt % MgO, and reaches a minimum temperature at 2.0 to 2.3 wt % MgO.

Curve 4 in FIG. 1 illustrates the relationship between the liquidus temperature and the amount of MgO in the glass compositions shown in Examples 31–38 in Table 4. As can be seen, based on this curve, the liquidus temperature approaches a minimum in the range of 2.3 to 2.7 wt % MgO, and reaches a minimum temperature at 2.35 to 2.6 wt % MgO.

Curve 5 in FIG. 1 illustrates the relationship between the liquidus temperature and the amount of MgO in the glass compositions shown in Examples 39–49 in Table 5. As can be seen, based on this curve, the liquidus temperature approaches a minimum in the range of 1.8 to 2.5 wt % MgO, and reaches a minimum temperature at 2.0 to 2.3 wt % MgO.

Curve 6 in FIG. 1 illustrates the relationship between the liquidus temperature and the amount of MgO in the glass compositions shown in Examples 50–58 in Table 6. As can be seen, based on this curve, the liquidus temperature approaches a minimum in the range of 2.3 to 2.7 wt % MgO, and reaches a minimum temperature at 2.4 to 2.6 wt % MgO.

Curve 7 in FIG. 1 illustrates the relationship between the liquidus temperature and the amount of MgO in the glass compositions shown in Examples 59–66 in Table 7. The control sample discussed above was incorporated into Curve 7. As can be seen, based on this curve, the liquidus temperature approaches a minimum in the range of 2.7 to 3.2 wt % MgO, and reaches a minimum temperature at 2.8 to 3.1 wt % MgO.

As can be seen in Curves 1–7, the amount of MgO impacts the liquidus temperature and in particular, the amount of MgO can be controlled to generate a minimum liquidus temperature for a glass fiber forming composition.

FIG. 2 Illustrates the relationship between the liquidus temperature and the amount of MgO for various combinations of Examples 8–58 in Tables 2–6. More specifically, Curve A plots the liquidus temperature versus the amount of MgO for the glass compositions shown in Tables 2, 3, and 4, Curve B plots the liquidus temperature versus the amount of MgO for the glass compositions shown in Tables 3, 5 and 6, and Curve C plots the liquidus temperature versus the amount of MgO for the glass compositions shown in Tables 2–6. It is appreciated that Curves A, B and C combine the liquidus temperature for different glass compositions. More specifically, the glass compositions represented by Curve A have the same $Li_2O$ level but differ in the amount of $TiO_2$, the glass compositions represented by Curve B have the same amount of $TiO_2$ but differ in the amount of $Li_2O$ and ZnO (although the total amount of $Li_2O+ZnO$ is the same), and the glass compositions represented by Curve C differ in the amounts of $TiO_2$, $Li_2O$ and/or ZnO. However, these combinations are offered to illustrate the trend in the liquidus temperature as the amount of MgO varies.

Referring to FIG. 2, it can be seen that the liquidus temperature for Curves A, B and C approaches a minimum in the range of 1.7 to 2.65 wt % MgO, and reaches a minimum temperature at 1.90 to 2.55 wt % MgO.

The fact that the glass compositions of Tables 2–6 exhibit a minimum liquidus temperature (as shown in Curves 2–6, A, B and C) than the glass compositions of Table 1 (as shown in Curve 1) is to be expected since Examples 8–58 in Tables 2–6 all included additives, and in particular, $Li_2O$ and/or ZnO, which reduce liquidus temperature. However, of particular significance is the fact that the minimum liquidus temperatures for the glass compositions of Tables 2–6 are generally within an MgO range lower than that of the glass compositions of Table 1.

In viewing Curves 1–7 and A–C in FIGS. 1 and 2, it is clear that the amount of MgO impacts the heating and melting profile of a glass fiber forming compositions, and in particular, the MgO content can be used to minimize the liquidus temperature of a glass fiber forming composition and allow for a lower forming temperature while maintaining the $\Delta T$ required to facilitate a continuous and uninterrupted glass fiber forming operation.

Examples 67–98 in Table 8 are additional examples of glass compositions of the present invention having 2.3 to 2.55 wt % MgO and a $\Delta T$ of greater than 90° F. based on a NIST 714 reference standard. These laboratory samples include up to 3 wt % $B_2O_3$, up to 0.9 wt % $Na_2O$, up to 1.1 wt % $TiO_2$, up to 0.9 wt % $Li_2O$, p to 1 wt % ZnO, up to 3 wt % MnO, and up to 3 wt % $MnO_2$ based on their batch composition, as discussed earlier. The samples were made in the same manner as those in Tables 1–7.

TABLE 8

|  | Ex. 67 | Ex. 68** | Ex. 69 | Ex. 70 | Ex. 71 | Ex. 72 | Ex. 73 | Ex. 74 |
| --- | --- | --- | --- | --- | --- | --- | --- | --- |
| $SiO_2$ (wt %) | 60.12 | 59.61 | 59.11 | 58.61 | 60.12 | 59.01 | 59.31 | 59.61 |
| $Al_2O_3$ (wt %) | 13.00 | 12.16 | 12.16 | 12.16 | 13.00 | 12.04 | 12.10 | 12.16 |
| CaO (wt %) | 21.13 | 23.50 | 23.00 | 23.50 | 21.13 | 23.27 | 23.38 | 23.50 |
| MgO (wt %) | 2.50 | 2.50 | 2.50 | 2.50 | 2.50 | 2.48 | 2.49 | 2.50 |
| $TiO_2$ (wt %) | 1.10 | 1.10 | 1.10 | 1.10 | 1.10 | 1.09 | 1.09 | 1.10 |
| $B_2O_3$ (wt %) | 1.00 | 0.30 | 1.00 | 1.00 | 1.00 | 1.00 | 0.50 | 0.50 |
| $Na_2O$ (wt %) |  |  |  |  |  | 0.89 | 0.89 |  |
| $Li_2O$ (wt %) |  | 0.20 | 0.90 | 0.90 | 0.90 |  |  | 0.50 |
| ZnO (wt %) | 0.90 | 0.20 |  |  |  |  |  |  |
| MnO (wt %) |  | 0.20 |  |  |  |  |  |  |
| $MnO_2$ (wt %) |  |  |  |  |  |  |  |  |
| $Fe_2O_3$ (wt %) | 0.25 | 0.23 | 0.23 | 0.23 | 0.25 | 0.23 | 0.23 | 0.23 |
| $SiO_2/RO$ | 2.54 | 2.29 | 2.32 | 2.25 | 2.54 | 2.29 | 2.29 | 2.29 |
| NIST 717A |  |  |  |  |  |  |  |  |
| $T_{FORM}$ (° F.) | 2235 | 2247 | 2178 | 2172 | 2318 | 2260 | 2255 | 2221 |
| $T_{LIQ}$ (° F.) | 2082 | 2099 | 2088 | 2088 | 2172 | 2152 | 2154 | 2111 |
| $\Delta T$ (° F.) | 153 | 148 | 90 | 79 | 146 | 108 | 101 | 110 |
| NIST 714 |  |  |  |  |  |  |  |  |
| $T_{FORM}$ (° F.) | 2260 | 2272 | 2201 | 2194 | 2345 | 2286 | 2280 | 2246 |
| $T_{LIQ}$ (° F.) | 2082 | 2099 | 2088 | 2088 | 2172 | 2152 | 2154 | 2111 |
| $\Delta T$ (° F.) | 178 | 173 | 113 | 106 | 173 | 134 | 126 | 135 |
|  | Ex. 75 | Ex. 76 | Ex. 77 | Ex. 78 | Ex. 79** | Ex. 80** | Ex. 81** | Ex. 82 |
| $SiO_2$ (wt %) | 59.40 | 59.20 | 59.61 | 59.61 | 59.61 | 57.72 | 59.61 | 58.61 |
| $Al_2O_3$ (wt %) | 12.16 | 12.16 | 12.16 | 12.16 | 12.16 | 11.80 | 12.16 | 12.16 |
| CaO (wt %) | 23.49 | 23.69 | 23.50 | 23.50 | 20.50 | 22.80 | 20.50 | 23.50 |
| MgO (wt %) | 2.30 | 2.30 | 2.50 | 2.50 | 2.50 | 2.52 | 2.50 | 2.50 |
| $TiO_2$ (wt %) | 1.10 | 1.10 | 1.10 | 1.10 | 1.10 | 1.07 | 1.10 | 1.10 |
| $B_2O_3$ (wt %) |  |  | 0.30 | 0.45 |  |  |  | 1.00 |
| $Na_2O$ (wt %) | 0.40 | 0.40 |  |  | 0.90 | 0.87 | 0.90 |  |
| $Li_2O$ (wt %) | 0.45 | 0.45 | 0.30 |  |  |  |  | 0.30 |
| ZnO (wt %) | 0.45 | 0.45 | 0.30 | 0.45 |  |  |  | 0.30 |
| MnO (wt %) |  |  |  |  | 3.00 |  |  | 0.30 |
| $MnO_2$ (wt %) |  |  |  |  |  | 3.00 | 3.00 |  |
| $Fe_2O_3$ (wt %) | 0.25 | 0.25 | 0.23 | 0.23 | 0.23 | 0.22 | 0.23 | 0.23 |
| $SiO_2/RO$ | 2.30 | 2.28 | 2.29 | 2.29 | 2.59 | 2.28 | 2.59 | 2.25 |
| NIST 717A |  |  |  |  |  |  |  |  |
| $T_{FORM}$ (° F.) | 2246 | 2250 | 2235 | 2271 | 2221 | 2196 | 2224 | 2226 |
| $T_{LIQ}$ (° F.) | 2118 | 2105 | 2113 | 2113 | 2117 | 2125 | 2118 | 2082 |
| $\Delta T$ (° F.) | 128 | 145 | 122 | 158 | 104 | 71 | 106 | 144 |
| NIST 714 |  |  |  |  |  |  |  |  |
| $T_{FORM}$ (° F.) | 2273 | 2277 | 2260 | 2298 | 2245 | 2219 | 2249 | 2251 |
| $T_{LIQ}$ (° F.) | 2118 | 2105 | 2113 | 2113 | 2117 | 2125 | 2118 | 2082 |
| $\Delta T$ (° F.) | 155 | 172 | 147 | 185 | 128 | 94 | 131 | 169 |

TABLE 8-continued

|  | Ex. 83 | Ex. 84 | Ex. 85 | Ex. 86 | Ex. 87 | Ex. 88 | Ex. 89 | Ex. 90 |
|---|---|---|---|---|---|---|---|---|
| $SiO_2$ (wt %) | 58.96 | 58.70 | 58.35 | 57.65 | 58.15 | 57.95 | 58.20 | 58.10 |
| $Al_2O_3$ (wt %) | 13.24 | 13.35 | 13.20 | 13.40 | 13.20 | 13.20 | 13.03 | 13.03 |
| CaO (wt %) | 23.65 | 23.50 | 23.65 | 24.15 | 22.85 | 24.05 | 23.64 | 23.74 |
| MgO (wt %) | 2.5 | 2.50 | 2.55 | 2.55 | 2.55 | 2.55 | 2.50 | 2.50 |
| $TiO_2$ (wt %) | .50 | 0.50 | 1.10 | 1.10 | 1.10 | 1.10 | 0.50 | 0.50 |
| $B_2O_3$ (wt %) |  |  |  |  |  |  |  |  |
| $Na_2O$ (wt %) |  | 0.30 |  |  |  |  |  |  |
| $Li_2O$ (wt %) | 0.90 | 0.90 | 0.90 | 0.90 | 0.90 | 0.90 | 0.90 | 0.90 |
| ZnO (wt %) |  |  |  |  | 1.00 | 1.00 | 1.00 | 1.00 |
| MnO (wt %) |  |  |  |  |  |  |  |  |
| $MnO_2$ (wt %) |  |  |  |  |  |  |  |  |
| $Fe_2O_3$ (wt %) | 0.25 | 0.25 | 0.25 | 0.25 | 0.25 | 0.25 | 0.23 | 0.23 |
| $SiO_2$/RO | 2.25 | 2.26 | 2.23 | 2.16 | 2.29 | 2.18 | 2.23 | 2.21 |
| NIST 717A |  |  |  |  |  |  |  |  |
| $T_{FORM}$ (° F.) |  |  |  |  |  |  |  |  |
| $T_{LIQ}$ (° F.) |  |  |  |  |  |  |  |  |
| $\Delta T$ (° F.) |  |  |  |  |  |  |  |  |
| NIST 714 |  |  |  |  |  |  |  |  |
| $T_{FORM}$ (° F.) | 2214 | 2212 | 2212 | 2203 | 2205 | 2183 | 2201 | 2203 |
| $T_{LIQ}$ (° F.) | 2116 | 2107 | 2095 | 2109 | 2077 | 2084 | 2098 | 2091 |
| $\Delta T$ (° F.) | 98 | 105 | 117 | 94 | 128 | 99 | 103 | 112 |

|  | Ex. 91 | Ex. 92 | Ex. 93 | Ex. 94 | Ex. 95 | Ex. 96 | Ex. 97 | Ex. 98 |
|---|---|---|---|---|---|---|---|---|
| $SiO_2$ (wt %) | 58.00 | 58.10 | 58.30 | 57.60 | 56.25 | 55.75 | 56.00 | 57.75 |
| $Al_2O_3$ (wt %) | 13.03 | 13.03 | 13.03 | 13.23 | 13.20 | 13.20 | 13.60 | 13.20 |
| CaO (wt %) | 23.84 | 23.74 | 23.54 | 23.84 | 23.75 | 23.25 | 24.25 | 24.25 |
| MgO (wt %) | 2.50 | 2.50 | 2.50 | 2.50 | 2.50 | 2.55 | 2.50 | 2.55 |
| $TiO_2$ (wt %) | 0.50 | 0.50 | 0.50 | 0.50 | 1.10 | 1.10 | 0.50 | 1.10 |
| $B_2O_3$ (wt %) | 1.00 | 1.00 | 1.00 | 1.20 | 2.00 | 3.00 | 2.00 |  |
| $Na_2O$ (wt %) |  |  |  | 0.10 | 0.90 | 0.90 | 0.90 | 0.90 |
| $Li_2O$ (wt %) | 0.90 | 0.90 | 0.90 | 0.80 |  |  |  |  |
| ZnO (wt %) |  |  |  |  |  |  |  |  |
| MnO (wt %) |  |  |  |  |  |  |  |  |
| $MnO_2$ (wt %) |  |  |  |  |  |  |  |  |
| $Fe_2O_3$ (wt %) | 0.23 | 0.23 | 0.23 | 0.23 | 0.25 | 0.25 | 0.25 | 0.25 |
| $SiO_2$/RO | 2.20 | 2.21 | 2.24 | 2.19 | 2.14 | 2.16 | 2.09 | 2.15 |
| NIST 717A |  |  |  |  |  |  |  |  |
| $T_{FORM}$ (° F.) |  |  |  |  |  |  |  |  |
| $T_{LIQ}$ (° F.) |  |  |  |  |  |  |  |  |
| $\Delta T$ (° F.) |  |  |  |  |  |  |  |  |
| NIST 714 |  |  |  |  |  |  |  |  |
| $T_{FORM}$ (° F.) | 2178 | 2181 | 2183 | 2185 | 2235 | 2199 | 2215 | 2250 |
| $T_{LIQ}$ (° F.) | 2079 | 2075 | 2084 | 2071 | 2100 | 2060 | 2077 | 2131 |
| $\Delta T$ (° F.) | 99 | 106 | 99 | 114 | 135 | 139 | 138 | 119 |

**average of two samples

Table 9 includes several glass fiber melt compositions made in a commercial glass melting operation. The amount of each constituent in the table is the weight percent in the actual melt. The weight percent for the $Li_2O$ was determined using wet chemical analysis techniques, the weight percent for the $B_2O_3$ was determined using Neutron Transmission analysis techniques, and the weight percent for the remaining constituents was determined using X-ray fluorescence analysis (also referred to as "XRF analysis"), all of which are well know to those skilled in the art.

TABLE 9

|  | Ex. 99 | Ex. 100 | Ex. 101 | Ex. 102 |
|---|---|---|---|---|
| $SiO_2$ (wt %) | 57.97 | 56.83 | 58.57 | 58.46 |
| $Al_2O_3$ (wt %) | 12.28 | 13.28 | 12.44 | 12.32 |
| CaO (wt %) | 24.15 | 23.71 | 23.85 | 23.70 |
| MgO (wt %) | 2.6 | 2.45 | 2.42 | 2.48 |
| $TiO_2$ (wt %) | 1.16 | 0.55 | 0.51 | 0.50 |
| $B_2O_3$ (wt %) |  | 2.10 | 1.37 | 1.2 |

TABLE 9-continued

|  | Ex. 99 | Ex. 100 | Ex. 101 | Ex. 102 |
|---|---|---|---|---|
| $Na_2O$ (wt %) | 0.89 | 0.87 |  |  |
| $Li_2O$ (wt %) |  |  | 0.84 | 0.88 |
| $K_2O$ (wt %) | 0.06 | 0.06 | 0.07 | 0.07 |
| $Fe_2O_3$ (wt %) | 0.28 | 0.28 | 0.27 | 0.275 |
| $SiO_2$/RO | 2.17 | 2.17 | 2.23 | 2.23 |
| NIST 714 |  |  |  |  |
| $T_{FORM}$ (° F.) | 2253 | 2224 | 2183 | 2185 |
| $T_{LIQ}$ (° F.) | 2140 | 2061 | 2082 | 2080 |
| $\Delta T$ (° F.) | 113 | 164 | 101 | 105 |

Based on the above, in one nonlimiting embodiment of the present invention, the glass fiber compositions have a base composition of $SiO_2$, CaO, $Al_2O_3$ and $Fe_2O_3$, and optionally $Na_2O$, as discussed above, and a MgO content ranging from 1.7 to 2.9 wt %, preferably from 1.8 to 2.9 wt %, and more preferably 1.8 to 2.7. In another nonlimiting embodiment, the glass fiber compositions have a MgO content ranging from 1.7 to 2.7 wt %, and preferably from 1.9 to 2.65 wt %.

In one nonlimiting embodiment of the invention, for glass compositions that do not include any liquidus temperature reducing additives other than MgO or only trace amounts of these additive, i.e. less than 0.05 wt, the MgO range is 2.2 to 2.9, preferably from 2.4 to 2.8 wt %, and more 2.45 to 2.65 wt %. In another embodiment of glass compositions with little or no liquidus temperature reducing additives other than MgO, the MgO range is from 2.2 to 2.7, and preferably from 2.3 to 2.6 wt %.

In still another nonlimiting embodiment of the invention, in glass compositions that include a total amount of at least 0.05 wt % of liquidus temperature lowering additives, the MgO content ranges from 1.7 to 2.65 wt %, and preferably between 1.8 and 2.6 wt %, and more preferably 1.9 to 2.55 wt %. In another nonlimiting embodiment of glass compositions that include liquidus temperature lowering additives, the MgO content ranges from 1.7 to 2.5 wt %, and preferably between 1.8 and 2.3 wt %. In one nonlimiting embodiment of the present invention, the liquidus temperature lowering additives in the glass fiber compositions include, but are not limited to, $Li_2O$, $ZnO$, $MnO$, $MnO_2$ and/or $B_2O_3$ in the amounts discussed earlier.

It should be appreciated that although other commercially available glasses reduce environmental hazards due to boron and fluorine emissions by reducing or eliminating these materials from the batch, these glasses are processed at higher forming temperatures that conventional E-glass. As a result, they require additional energy for production. The present invention provides glass compositions that include little or no boron and/or fluorine and have a forming temperature generally lower than other low boron and/or fluorine glass compositions, and boron-free and fluorine-free glass compositions, and more specifically, have forming temperatures approaching that of E-glass. In one nonlimiting embodiment of the invention, the forming temperature of the glass compositions of the present invention should be no greater than 2280° F. (1249° C.), and preferably no greater than 2260° F. (1238° C.), and more preferably no greater than 2230° F. (1221° C.), based on the NIST 714 reference standard. In one particular nonlimiting embodiment of the invention, the forming temperature is no greater than 2200° F. (1204° C.), based on the NIST 714 reference standard.

In addition, in one nonlimiting embodiment of the present invention, the liquidus temperature of the glass compositions of the present invention should be no greater than 2155° F. (1179° C.), and preferably no greater than 2145° F. (1174° C.), and more preferably no greater than 2130° F. (1166° C.).

As discussed earlier, in the glass fiber forming industry, ΔT should be maintained in a range sufficient to prevent devitrification of the molten glass in the bushing area of a glass fiber forming operation and stagnant areas of the glass melting furnace. In the present invention, it ΔT should be at least 65° F. (36° C.), preferably at least 90° F. (50° C.), and more preferably at least 100° F. (56° C.). In addition, although not required, in order to maintain the overall heating and melting requirements of the glass fiber composition low, it is preferred that ΔT be no greater than 150° F. (83° C.) and more preferably no greater than 125° F. (69° C.). This will maintain a lower forming temperature for a given liquidus temperature and result in good energy efficiency. If required, the amounts of $SiO_2$ and $CaO$ can be modified to change the forming temperature and provide a desired ΔT. More specifically, reducing the silica content while simultaneously maintaining or increasing the calcia content (thus reducing the $SiO_2$/RO ratio) will reduce the forming temperature and thus reduce ΔT. This type of modification would be of value if, for example, ΔT was much greater than 100° F. and could be reduced without adversely affecting the glass melting and forming operation. Conversely, increasing the silica content and while simultaneously maintaining or reducing the calcia content (thus increasing the $SiO_2$/RO ratio) will raise the forming temperature and thus increase ΔT. This type of modification would be of value if, for example, ΔT was too low and had to be increased to at least 100° F. Compositional adjustments of the silica and/or calcia (and the resulting $SiO_2$/RO ratio) in either direction are possible until the ΔT is obtained that is deemed to facilitate the pursuit of a safe industrial melt forming process.

As discussed above, the $SiO_2$/RO ratio can be manipulated to further assist in achieving the goal of lowering the overall processing temperature, and in particular lowering the forming temperature while providing a ΔT required to facilitate continuous fiber forming operation. Although not limiting in the present invention, the glass fiber compositions of the present invention have an $SiO_2$/RO ratio of no greater than 2.3, preferably no greater than 2.25, and more preferably no greater than 2.2.

The invention has been described with reference to specific embodiments, but it should be understood that variations and modifications that are known to those of skill in the art may be resorted to within the scope of the invention as defined by the claims.

I claim:

1. A glass fiber composition comprising:

| | |
|---|---|
| $SiO_2$ | 52 to 59 percent by weight; |
| $Na_2O$ | 0 to 2 percent by weight; |
| CaO | 16 to 25 percent by weight; |
| $Al_2O_3$ | 8 to 16 percent by weight |
| $Fe_2O_3$ | 0.05 to 0.80 percent by weight; |
| $K_2O$ | 0 to 2 percent by weight; |
| MgO | 1.7 to 2.9 percent by weight; |
| $B_2O_3$ | 0.05 to 2 percent by weight; |
| $TiO_2$ | 0 to 2 percent by weight; and |
| $Li_2O$ | 0.2 to 1 percent by weight; | wherein the glass composition has a weight ratio of $SiO_2$ to RO no greater than 2.3, wherein R is Ca and Mg.

2. The glass fiber composition according to claim 1, wherein the glass composition has a forming temperature of no greater than 2200° F. based on an NIST 714 reference standard and a liquidus temperature of no greater than 2100° F.

3. The glass fiber composition according to claim 1, wherein the glass composition has a forming temperature of no greater than 2190° F. based on an NIST 714 reference standard and a liquidus temperature of no greater than 2090° F.

4. The glass fiber composition according to claim 1, wherein the MgO content is 2.2 to 2.9 percent by weight.

5. The glass fiber composition according to claim 1, wherein the MgO content is 2.4 to 2.7 percent by weight.

6. The glass fiber composition according to claim 1, wherein the glass composition has a $B_2O_3$ content of 0.5 to 1.5 percent by weight.

7. The glass fiber composition according to claim 1, wherein the $SiO_2$ content is 52 to 59 percent by weight, the CaO content is 20 to 25 percent by weight, the $Al_2O_3$ content is 11 to 14 percent by weight, and the $TiO_2$ content is 0.5 to 2 percent by weight.

8. The glass fiber composition according to claim 1, wherein the $SiO_2$ content is 57 to 59 percent by weight, the CaO content is 22 to 24 percent by weight, the $Al_2O_3$ content is 12 to 14 percent by weight, and the $TiO_2$ content is 0.5 to 1.5 percent by weight.

9. A glass fiber composition consisting essentially of:

| | |
|---|---|
| $SiO_2$ | 52 to 59 percent by weight; |
| $Na_2O$ | 0 to 2 percent by weight; |
| CaO | 16 to 25 percent by weight; |
| $Al_2O_3$ | 8 to 16 percent by weight |
| $Fe_2O_3$ | 0.05 to 0.80 percent by weight; |
| $K_2O$ | 0 to 2 percent by weight; |
| MgO | 1.7 to 2.9 percent by weight; |
| $B_2O_3$ | 0.05 to 2 percent by weight; |
| $TiO_2$ | 0 to 2 percent by weight; and |
| $Li_2O$ | 0.2 to 1 percent by weight; | wherein the glass composition has a weight ratio of $SiO_2$ to RO no greater than 2.3, wherein R is Ca and Mg.

10. The glass fiber composition according to claim 9, wherein the glass composition has a forming temperature of no greater than 2200° F. based on an NIST 714 reference standard and a liquidus temperature of no greater than 2100° F.

11. The glass fiber composition according to claim 9, wherein the glass composition has a forming temperature of no greater than 2190° F. based on an NIST 714 reference standard and a liquidus temperature of no greater than 2090° F.

12. The glass fiber composition according to claim 9, wherein the MgO content is 2.2 to 2.9 percent by weight.

13. The glass fiber composition according to claim 9, wherein the MgO content is 2.4 to 2.7 percent by weight.

14. The glass fiber composition according to claim 9, wherein the glass composition has a $B_2O_3$ content of 0.5 to 1.5 percent by weight.

15. The glass fiber composition according to claim 9, wherein the $SiO_2$ content is 52 to 59 percent by weight, the CaO content is 20 to 25 percent by weight, the $Al_2O_3$ content is 11 to 14 percent by weight, and the $TiO_2$ content is 0.5 to 2 percent by weight.

16. The glass fiber composition according to claim 9, wherein the $SiO_2$ content is 57 to 59 percent by weight, the CaO content is 22 to 24 percent by weight, the $Al_2O_3$ content is 12 to 14 percent by weight, and the $TiO_2$ content is 0.5 to 1.5 percent by weight.

17. The glass fiber composition according to claim 9, wherein the composition has a $\Delta T$ of at least 65° F.

18. A glass fiber composition comprising:

| | |
|---|---|
| $SiO_2$ | 57 to 59 percent by weight; |
| $Na_2O$ | 0 to 2 percent by weight; |
| CaO | 22 to 24 percent by weight; |
| $Al_2O_3$ | 12 to 14 percent by weight; |
| $Fe_2O_3$ | 0.05 to 0.80 percent by weight; |
| $K_2O$ | 0 to 2 percent by weight; |
| MgO | 2.4 to 2.7 percent by weight; |
| $B_2O_3$ | 0.5 to 1.5 percent by weight; |
| $TiO_2$ | 0.5 to 1.5 percent by weight; and |
| $Li_2O$ | 0.2 to 1 percent by weight; | wherein the glass composition has a weight ratio of $SiO_2$ to RO no greater than 2.3, wherein R is Ca and Mg.

19. The glass fiber composition according to claim 18, wherein the glass composition has a forming temperature of no greater than 2200° F. based on an NIST 714 reference standard and a liquidus temperature of no greater than 2100° F.

20. The glass fiber composition according to claim 18, wherein the glass composition has a forming temperature of no greater than 2190° F. based on an NIST 714 reference standard and a liquidus temperature of no greater than 2090° F.

21. The glass fiber composition according to claim 19, wherein the composition has a $\Delta T$ of at least 65° F.

22. The glass fiber composition according to claim 19, wherein the composition has a $\Delta T$ of at least 90° F.

\* \* \* \* \*